US012589683B2

(12) United States Patent
Nakazono et al.

(10) Patent No.: US 12,589,683 B2
(45) Date of Patent: Mar. 31, 2026

(54) SEAT PAD

(71) Applicant: TOYOTA BOSHOKU KABUSHIKI KAISHA, Aichi-ken (JP)

(72) Inventors: Hiroyuki Nakazono, Aichi-ken (JP); Naoto Shimotoi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 167 days.

(21) Appl. No.: 18/513,975

(22) Filed: Nov. 20, 2023

(65) Prior Publication Data

US 2024/0174144 A1 May 30, 2024

(30) Foreign Application Priority Data

Nov. 24, 2022 (JP) ................................. 2022-187202

(51) Int. Cl.
B60N 2/56 (2006.01)
A47C 7/18 (2006.01)

(52) U.S. Cl.
CPC .............. B60N 2/5621 (2013.01); A47C 7/18 (2013.01); B60N 2/5628 (2013.01)

(58) Field of Classification Search
CPC ..... A47C 7/744; A47C 31/116; B60N 2/5621; B60N 2/5628
See application file for complete search history.

(56) References Cited

U.S. PATENT DOCUMENTS 9,108,551 B2 * 8/2015 Ota ........................ B60N 2/7017
10,479,240 B2 * 11/2019 Longatte .............. B60N 2/7017

10,543,762 B2 1/2020 Ui et al.
10,632,877 B2 * 4/2020 Kondo .................... B60N 2/565
10,752,144 B2 * 8/2020 Kamei ................... B60N 2/682
11,458,800 B2 * 10/2022 Arata .................... B60N 2/5621
11,571,998 B2 * 2/2023 Binner ...................... B60N 2/20
11,613,189 B2 * 3/2023 Murgod .............. B60N 2/5642
297/180.14
12,024,076 B2 * 7/2024 Murgod .............. B60N 2/5642
12,139,056 B2 * 11/2024 Cluet ...................... B60N 2/70
2024/0172873 A1 * 5/2024 Ohira ................... B60N 2/5657

FOREIGN PATENT DOCUMENTS

JP 2014094622 A * 5/2014
JP 2018-75916 5/2018
JP 2021-153645 10/2021

OTHER PUBLICATIONS

Office Action issued in Japan Patent Application No. 2022-187202, mailed Nov. 25, 2025, together with English translation thereof.

* cited by examiner

*Primary Examiner* — Rodney B White
(74) *Attorney, Agent, or Firm* — Greenblum & Bernstein, P.L.C.

(57) ABSTRACT

A seat pad having a pad body made of a polyurethane foam molding, a ventilation passage extending along a pad back surface of the pad body, a duct member which is harder than the pad body forming an inner peripheral wall of the ventilation passage, and a back surface member provided along the pad back surface. The duct member and the back surface member are integrally foam-molded with the pad body. The back surface member has an overlapping portion which is not provided on a bottom surface of the ventilation passage but is provided so as to overlap the duct member in the direction perpendicular to the plane in a non-bottom area outside the bottom surface.

9 Claims, 12 Drawing Sheets

SEAT PAD

CROSS-REFERENCE TO RELATED APPLICATIONS

This application claims priority to Japanese patent application serial number 2022-187202 filed Nov. 24, 2022, the contents of which is incorporated herein by reference in its entirety for all purposes.

BACKGROUND

The present disclosure relates to a seat pad. More specifically, the present disclosure relates to a seat pad having a concave ventilation passage extending along the back surface of the pad body.

Conventionally, a seat pad that includes a concave ventilation passage formed on a back surface of a seat and a cover plate that covers the ventilation passage as disclosed in Japanese Laid-Open Patent Publication No. 2018-75916.

However, the above seat pad does not have a duct member reinforcing the inner circumferential wall in the ventilation passage. Therefore, when a load is applied to the seat pad by seating, the ventilation passage collapses and narrows. Thus, there is a concern that the air conditioning performance may be deteriorated. On the other hand, if the above-mentioned duct member is arranged in the ventilation passage, it is necessary to cut the back surface member covered on the back surface of the seat according to the shape of the duct member. In such a case, if the duct member and the back surface member are integrally molded with the seat pad, urethane may leak out from the gap between the back surface member and the duct member. Thus, there is a concern that the appearance of the seat may be deteriorated. Therefore, the present disclosure provides a seat pad that can properly prevent urethane leakage during molding even when a duct member that reinforces the ventilation passage is provided.

In order to solve the above problems, there is a need for a seat pad of the present disclosure that takes the following measures.

SUMMARY

In accordance with an aspect of the present disclosure, an embodiment includes a pad body, a ventilation passage, a duct member, and a back surface member. The pad body is made of, for example, a polyurethane foam-molded body. The ventilation passage, which has a concave shape, extends along the pad back surface of the pad body. The duct member is harder than the pad body which is the inner peripheral wall of the ventilation passage. The back surface member, which has a planar shape, is provided along the pad back surface. The duct member and the back surface member are integrally foam-molded with the pad body. The back surface member is not provided on the bottom surface of the ventilation passage, and has an overlapping portion provided so as to overlap the duct member in the direction perpendicular to the plane in a non-bottom area outside the bottom surface.

According to the above configuration, the hard duct member maintains the shape of the ventilation passage; therefore, prevents the deterioration of air conditioning performance even with a load of the seated person. Further, the duct member and the back surface member are superimposed on each other in the direction perpendicular to the plane so as to prevent the leakage of urethane from the overlapping portion during foam molding of the pad body.

Moreover, the seat pad of the present disclosure may be further configured as follows. The duct member has an extension part that extends out of the ventilation passage and along the pad back surface. The overlapping portion overlaps the extension part in the direction perpendicular to the plane. Therefore, the back surface member and the duct member can be easily superimposed on each other without forming a complicated shape, in which the back surface member is superimposed on the concave shape of the ventilation passage. In addition, the overlapping portion overlaps the duct member in a region outside the ventilation passage, so as to form a wider ventilation passage.

Moreover, the seat pad of the present invention may be further configured as follows. The extension part overlaps the back surface member so as to sandwich the overlapping portion with the pad back surface. Therefore, the end of the overlapping portion, which is difficult to positionally fix because of the flexibility of the back surface member, can be fixed by being sandwiched between the extension part and the pad back surface, and the appearance of the back surface of the seat can be improved.

DETAILED DESCRIPTION

Embodiments for carrying out the present disclosure will be described below with reference to FIGS. 1-13. In the following description, when directions such as front, back, up, down, left, and right are indicated, they refer to the respective directions shown in the respective drawings. Further, when the term "seat width direction" is used, it refers to the lateral direction of a seat cushion 1, which will be described later.

Figure 1:
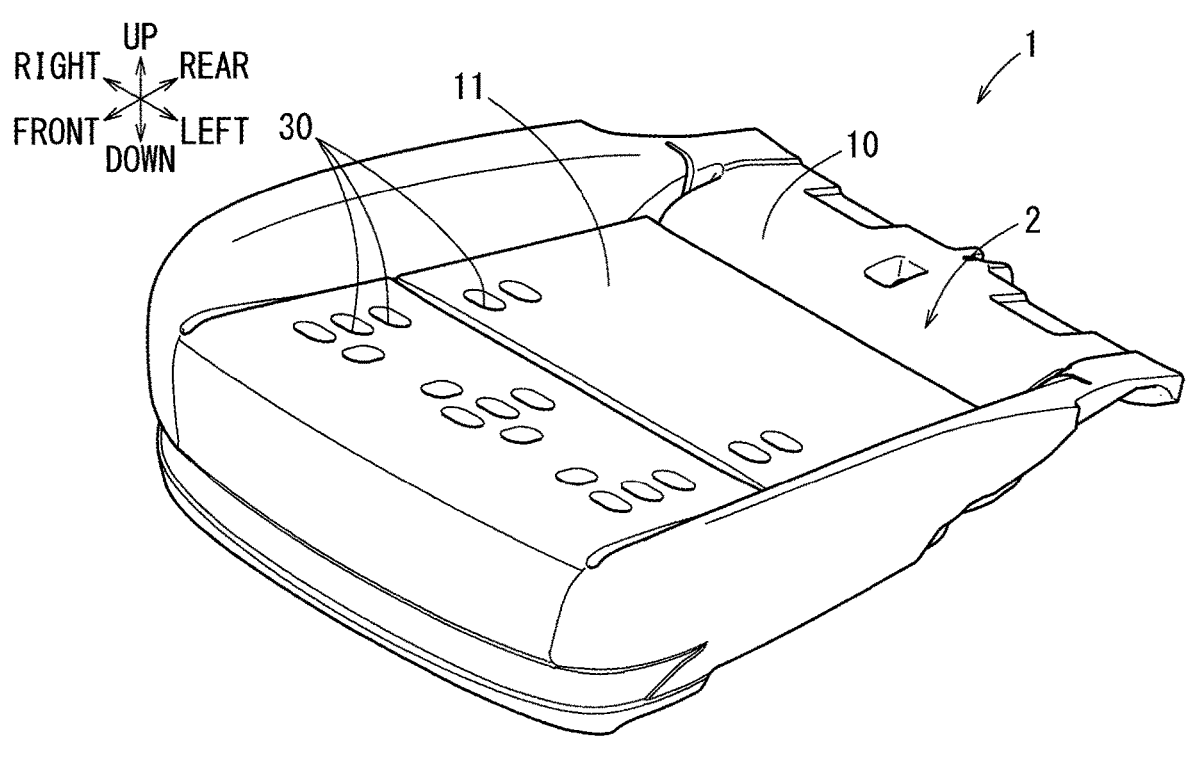
FIG. 1 is a perspective view of a seat pad according to an embodiment.
Figure 2:
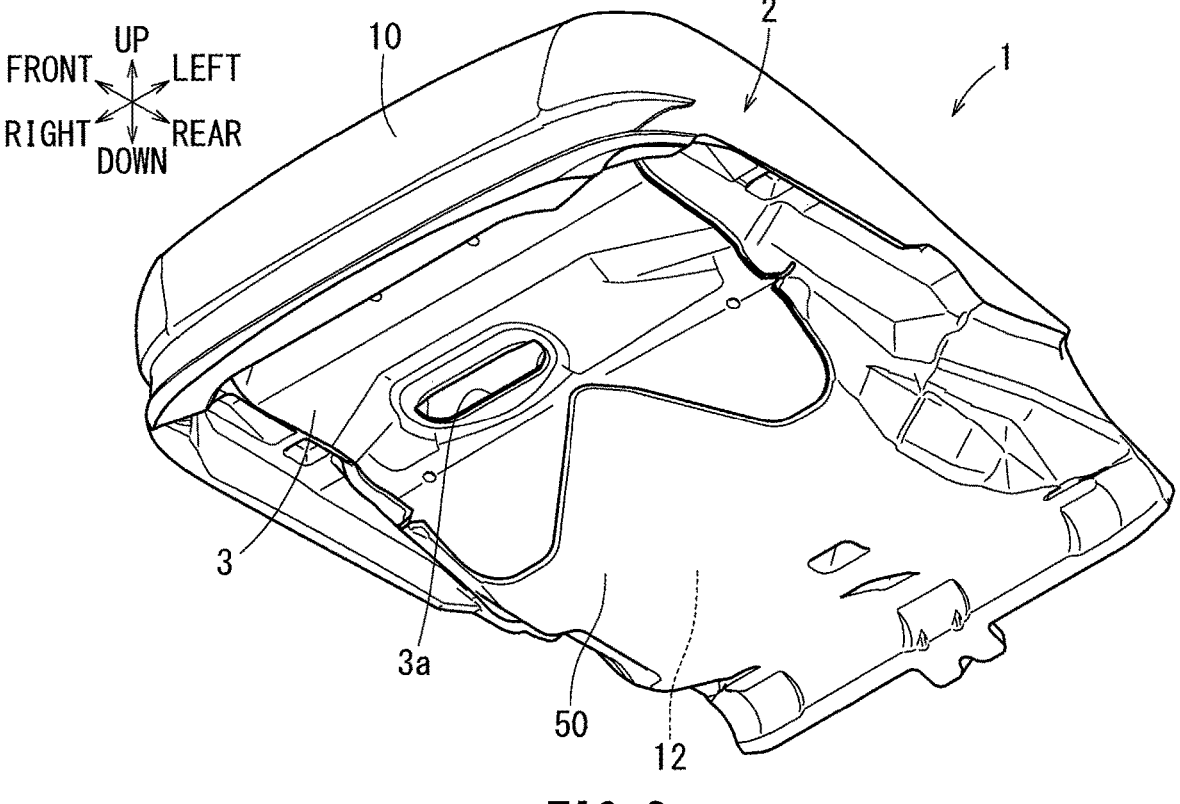
FIG. 2 is a perspective view of the seat pad of FIG. 1 viewed from below.

As shown in FIGS. 1-2, the seat pad is configured as a cushion pad 2 that forms a cushion member for a seat cushion 1 of a seat for a vehicle. The seat cushion 1 has the cushion pad 2 and a passage cover 3 which is assembled to cover the lower surface of the cushion pad 2. A fan (not shown) is connected to the passage cover 3 for air conditioning the seat.

Figure 3:
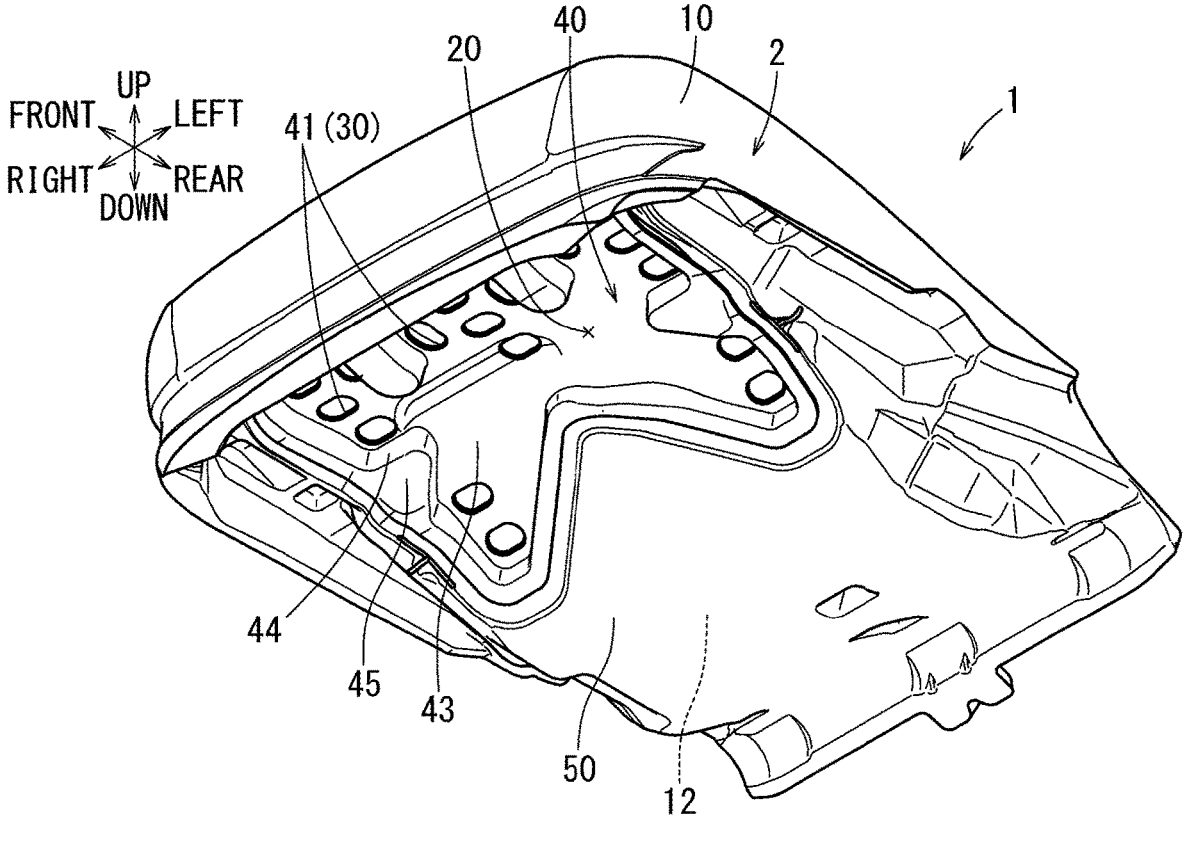
FIG. 3 is a perspective view of the seat pad of FIG. 1 viewed from below with a passage cover is removed.

As shown in FIGS. 1-3, the cushion pad 2 has a pad body 10 and a ventilation passage 20. The pad body 10 elastically supports the buttocks of the seated person. FIG. 3 shows that the ventilation passage 20 has a recessed shape and extends along a pad back surface 12 of the pad body 10. The pad body 10 is made of, for example, a polyurethane foam molding. The ventilation passage 20 has an opening that opens downward to the seat. The opening is closed by the passage cover 3. The cushion pad 2 also has ventilation holes 30 penetrating through the pad body 10 to a pad surface 11 at various locations of the ventilation passage 20 as illustrated in FIGS. 1 and 3.

Still in FIG. 3, the cushion pad 2 is configured such that the air conditioning of the fan functions efficiently via the ventilation passage 20 and the ventilation holes 30. Specifically, the air is sucked into each of the ventilation holes 30 from the pad surface 11 side by the fan blowing air downward of the seat cushion 1. The air flows through the ventilation passage 20 to a connection port 3a of the passage cover 3, and is exhausted below the seat cushion 1 by the fan as shown in FIG. 2. The heat trapped in the pad body 10 is therefore efficiently released to outside along with the flow of the wind. This configuration improves the comfort of the seat cushion 1. The fan according to the present embodiment is configured to generate a flow of air from the pad surface 11 side to the pad back surface 12 side as described above. However, for example, a configuration may be adopted in which air is sucked from the pad back surface 12 side so that air is blown out directly toward the seated person.

Figure 4:
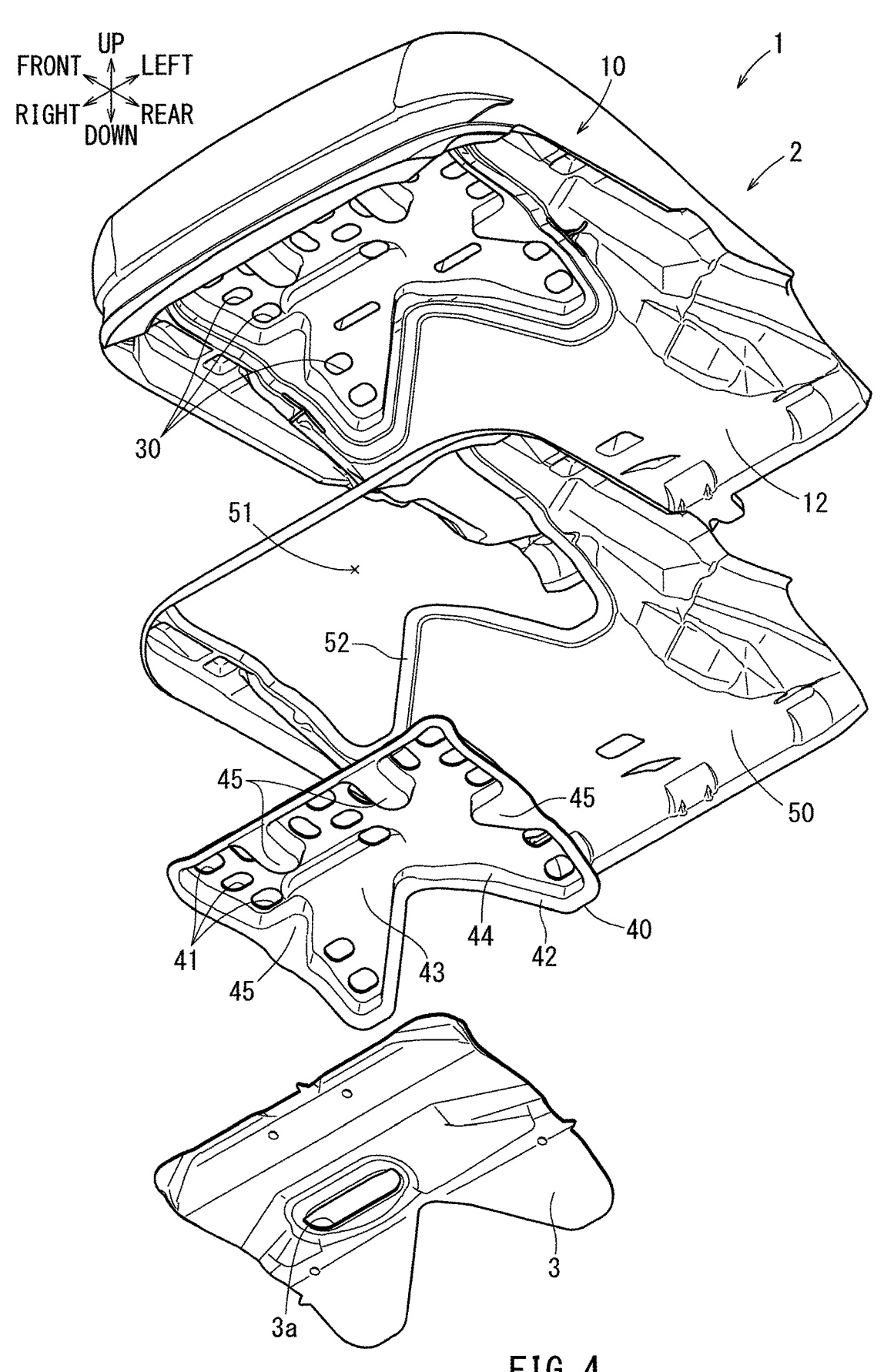
FIG. 4 is an exploded perspective view of the seat pad of FIG. 1.
Figure 5:
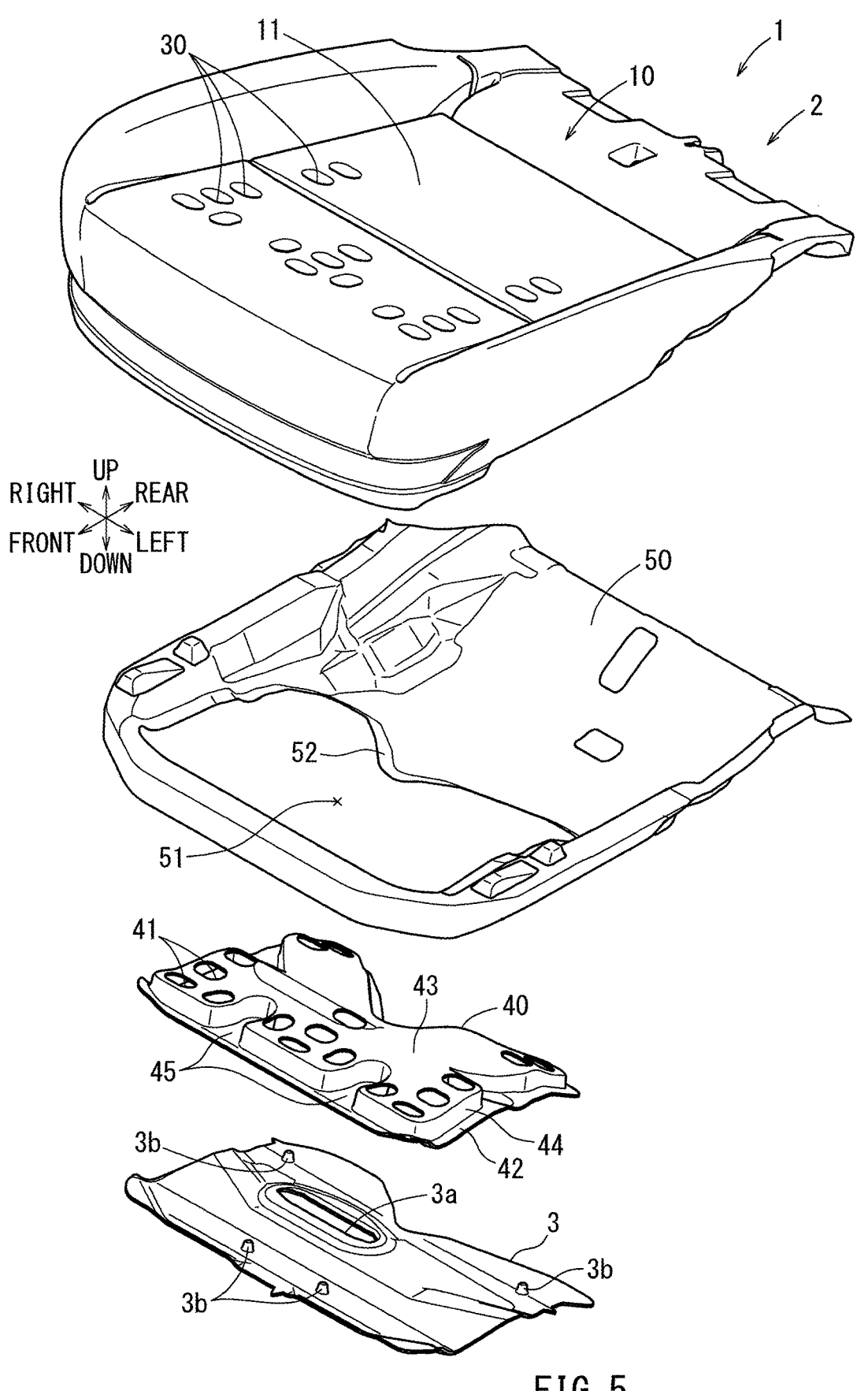
FIG. 5 is an exploded perspective view of the seat pad of FIG. 1 viewed from above.

As shown in FIGS. 3-5, the cushion pad 2 has a duct member 40 and a back surface member 50. The duct member 40 is formed as an inner peripheral wall of the ventilation passage 20. The back surface member 50 has a planer shape and is arranged along the pad back surface 12. The duct member 40 and the back surface member 50 are integrally formed during the foam molding of the pad body 10. The duct member 40 is made of, for example, pressed felt and is made stiffer than the pad body 10 by being pre-pressed into a predetermined shape. Therefore, the strength around the ventilation passage 20 of the cushion pad 2 can be increased because the hard duct member 40 is integrally molded with the pad body 10. Even if a load is applied to the cushion pad 2 from above due to the seating of an occupant, the shape of the ventilation passage 20 can be maintained so that the ventilation passage 20 does not crushed by the duct member 40. The airflow through the ventilation passage 20 is less likely to be blocked preventing the air conditioning performance from being deteriorated.

Figure 7:
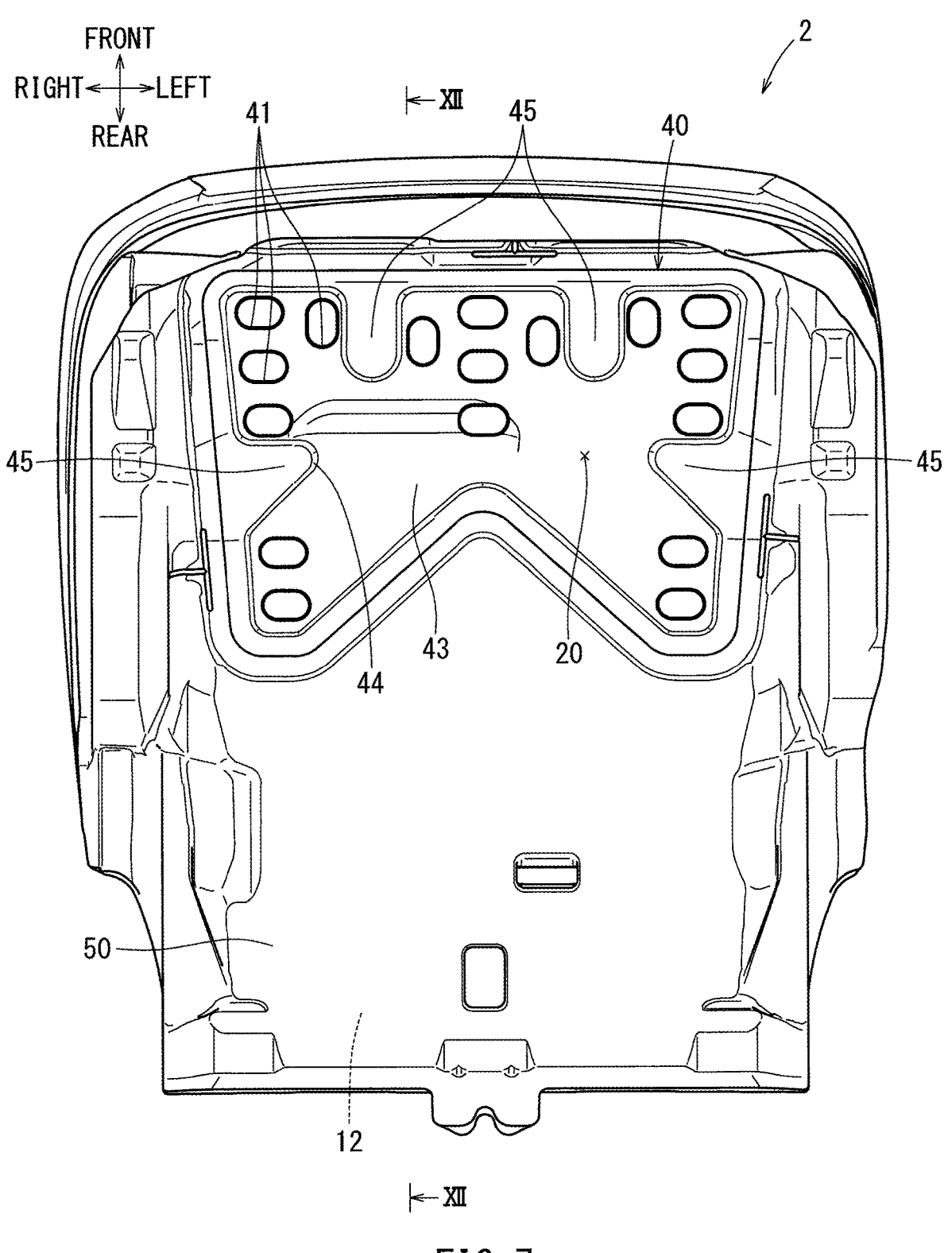
FIG. 7 is a bottom view of the seat pad of FIG. 1 with the passage cover is removed.

As shown in FIGS. 3-5 and 7, the duct member 40 is a substantially rectangular member with a square cutout at the center of the rear portion. The duct member 40 has a bottom surface 43, a side surface 44, and a bank portion 45 as illustrated in FIGS. 4-5 and 7. The bottom surface 43 has a concave shape. The side surface 44 rises from the periphery of the bottom surface 43 in the form of an upright wall. FIGS. 4-5 show a plurality of bank portions 45 protruding stepwise from some places on the bottom surface 43. FIG. 7 shows the ventilation passage 20 being formed so as to branch and extend in five directions from its central portion by the bank portions 45 and the notch in the rear portion.

Still in FIGS. 4-5 and 7, the duct member 40 has ventilation holes 41 through the bottom surface 43 that is corresponding to the ventilation holes 31 on the cushion pad 2. Each of the ventilation holes 41 is arranged so as to communicate with each of the corresponding ventilation holes 30. The duct member 40 has an extension part 42 projecting outward in the in-plane direction in a flange shape from the end where the side surface 44 rises. The extension part 42 forms the peripheral part of the duct member 40. The extension part 42 extends along the pad back surface 12 in a direction away from the ventilation passage 20.

As shown in FIG. 7, the back surface member 50 is made of, for example, planar nonwoven fabric to cover the pad back surface 12, excepts the recessed area of the ventilation passage 20. As shown in FIG. 3-4, the back surface member 50 has an opening 51 opening along the outer circumference of the ventilation passage 20 at the center of its front portion. Since the back surface member 50 has the opening 51, the ventilation passages 20 can be made larger by the thickness of the back surface member 50, compared to the configuration, in which the back surface member 50 is straddled over the ventilation passages 20. Further, the back surface member 50 can be easily provided on the pad back surface 12 without complicated structure such as overlapping the back surface member 50 with the concave shape of the ventilation passage 20.

Figure 8:
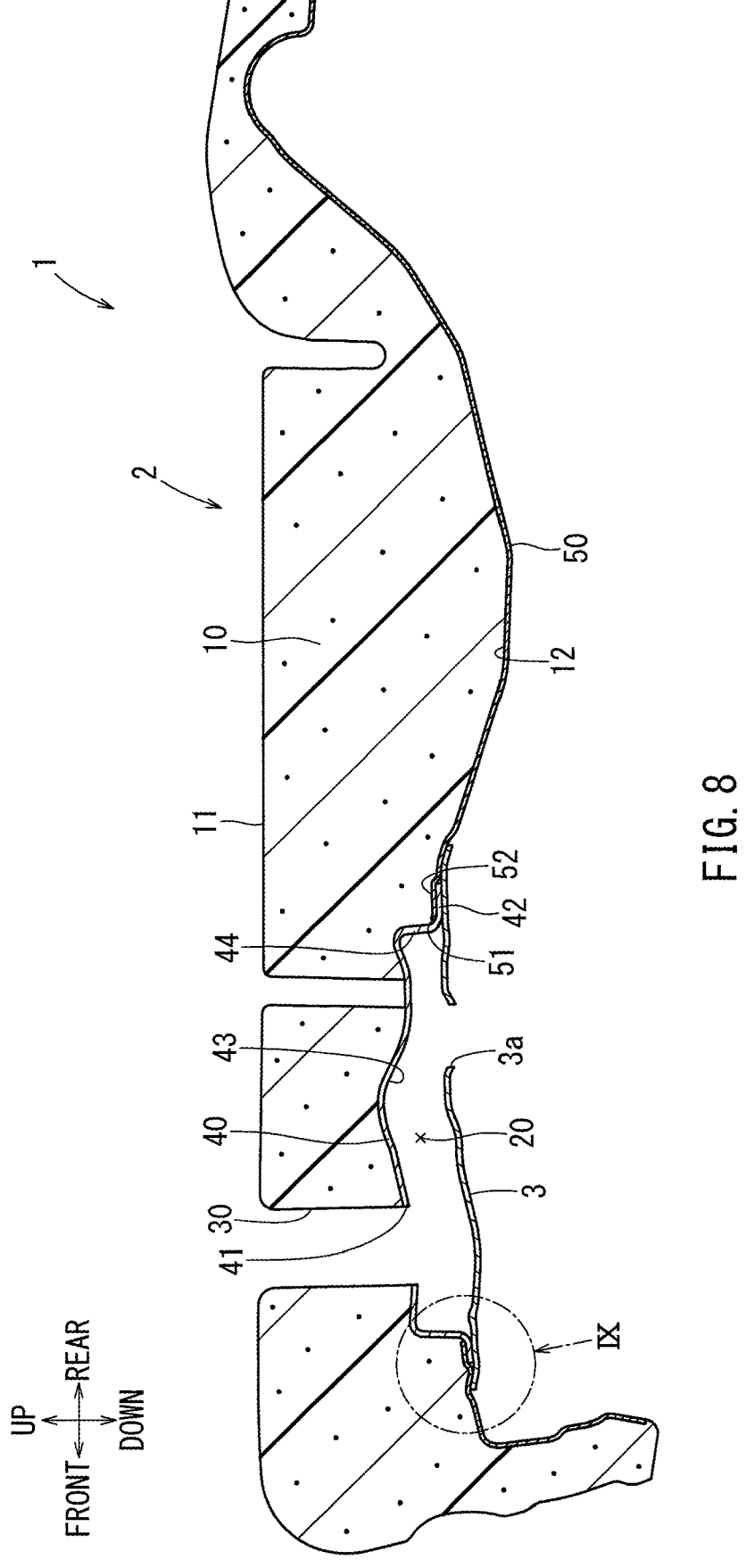
FIG. 8 is a cross-sectional view of the seat pad of FIG. 1 taken along the line VIII-VIII of FIG. 6.
Figure 9:
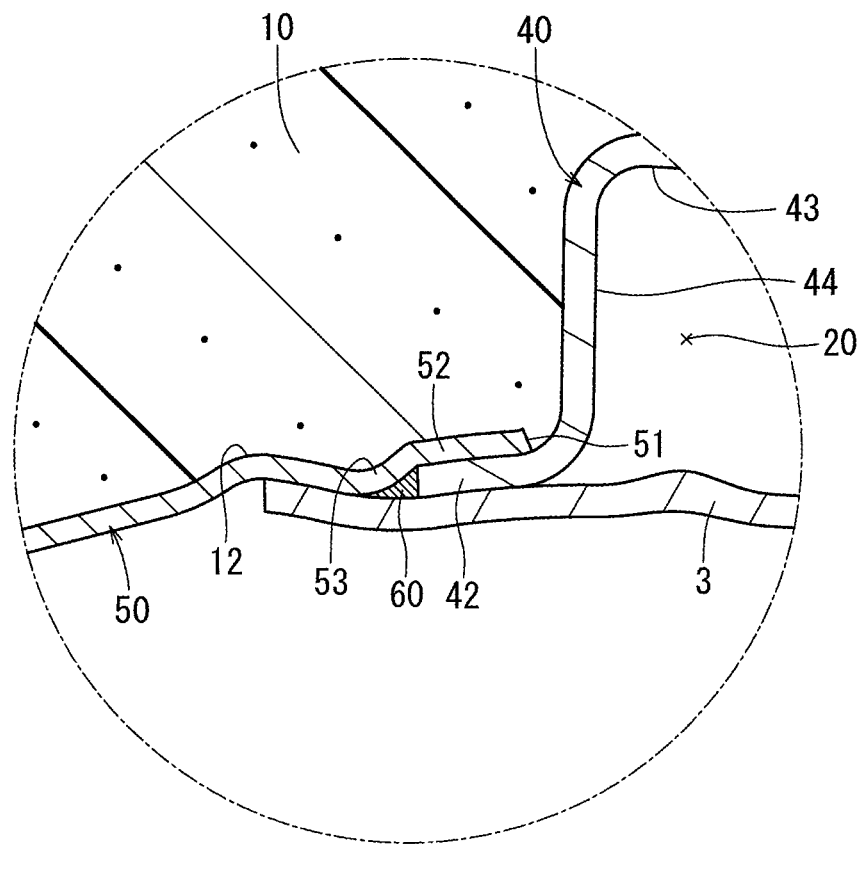
FIG. 9 is an enlarged view of the section IX of FIG. 8.

As shown in FIGS. 8-9, the back surface member 50 has an overlapping portion 52 sandwiched between the pad back surface 12 of the pad body 10 and the extension part 42 of the duct member 40. Specifically, the back surface member 50 is formed integrally with the pad body 10 so that the inner peripheral edge of the opening 51 is overlapped with the back surface (the upper surface in FIG. 9) of the extension part 42 of the duct member 40. Thereby, the overlapping portion 52 is formed. This configuration compared to a configuration, in which the overlapping portion 52 is superimposed on the surface (the lower surface in FIG. 9) of the extension part 42 and integrally molded, the end portion of the flexible overlapping portion 52 can be appropriately fixed by sandwiching between the extension part 42 and the pad back surface 12.

Still in FIGS. 8-9, the extension part 42 and the overlapping portion 52 are superimposed on each other in the direction perpendicular to the plane, so that reduces the gap between the duct member 40 and the back surface member 50. This configuration prevents the urethane leakage from between the duct member 40 and the back surface member 50 during foam molding of the pad body 10. It also prevents the appearance of the pad back surface 12 from being deteriorated because of urethane leakage.

Figure 6:
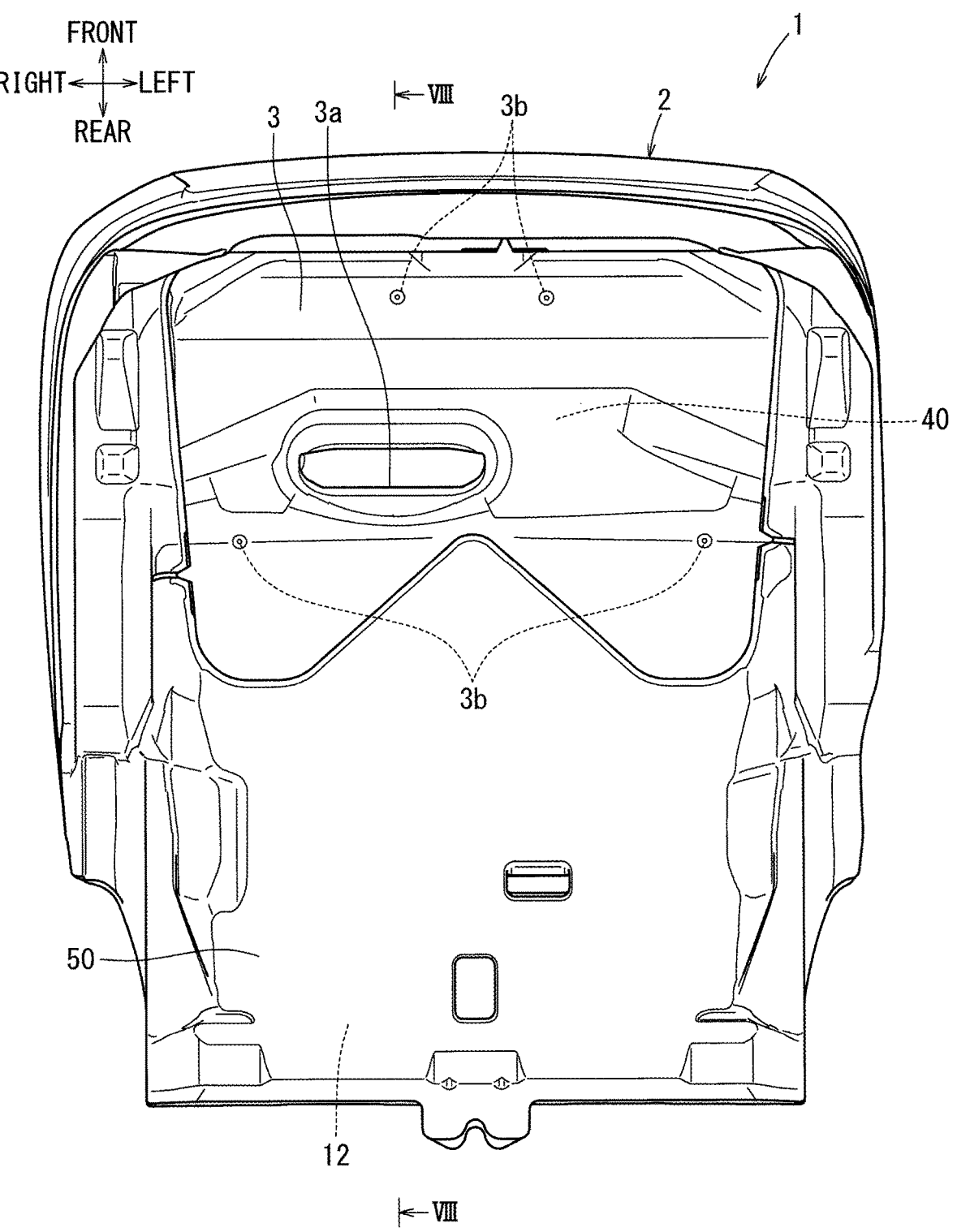
FIG. 6 is a bottom view of the seat pad of FIG. 1.

As shown in FIGS. 4-6, the passage cover 3 is made of, for example, a press felt and has a substantially rectangular shape with a corner-shaped notch at the rear center along the shape of the duct member 40. As shown in FIG. 8, the passage cover 3 is attached to the pad back surface 12, which is form-molded, from below. Specifically, as shown in FIG. 9, the passage cover 3 is attached to the pad back surface 12 by attaching the peripheral portion of the inner surface (the upper surface in FIG. 9) to the duct member 40 and the back surface member 50 with an adhesive 60 such as hot melt. The passage cover 3 is formed to be one size larger than the duct member 40. Therefore, the passage cover 3 covers the duct member 40 from below when assembled to the pad back surface 12, as shown in FIG. 6.

As shown in FIGS. 4-5, the passage cover 3 may have the connection port 3a and a positioning projection 3b. A fan (not shown) may be connected to the connection port 3a. A plurality of positioning projections 3b are formed at various locations on the inner surface of the passage cover 3. The passage cover 3 forms part of the inner surface of the ventilation passage 20 when assembled to the pad back surface 12. The connection port 3*a* is opened so as to penetrate the passage cover 3, and allows the ventilation passage 20 and a fan (not shown) to communicate with each other. Each positioning projection 3*b* abuts against a side surface 44 of each bank portion 45, respectively as shown in FIG. 5. The positioning projections 3*b* facilitate the positioning of the passage cover 3 in the front, rear, left, and right directions with respect to the pad back surface 12.

Figure 10:
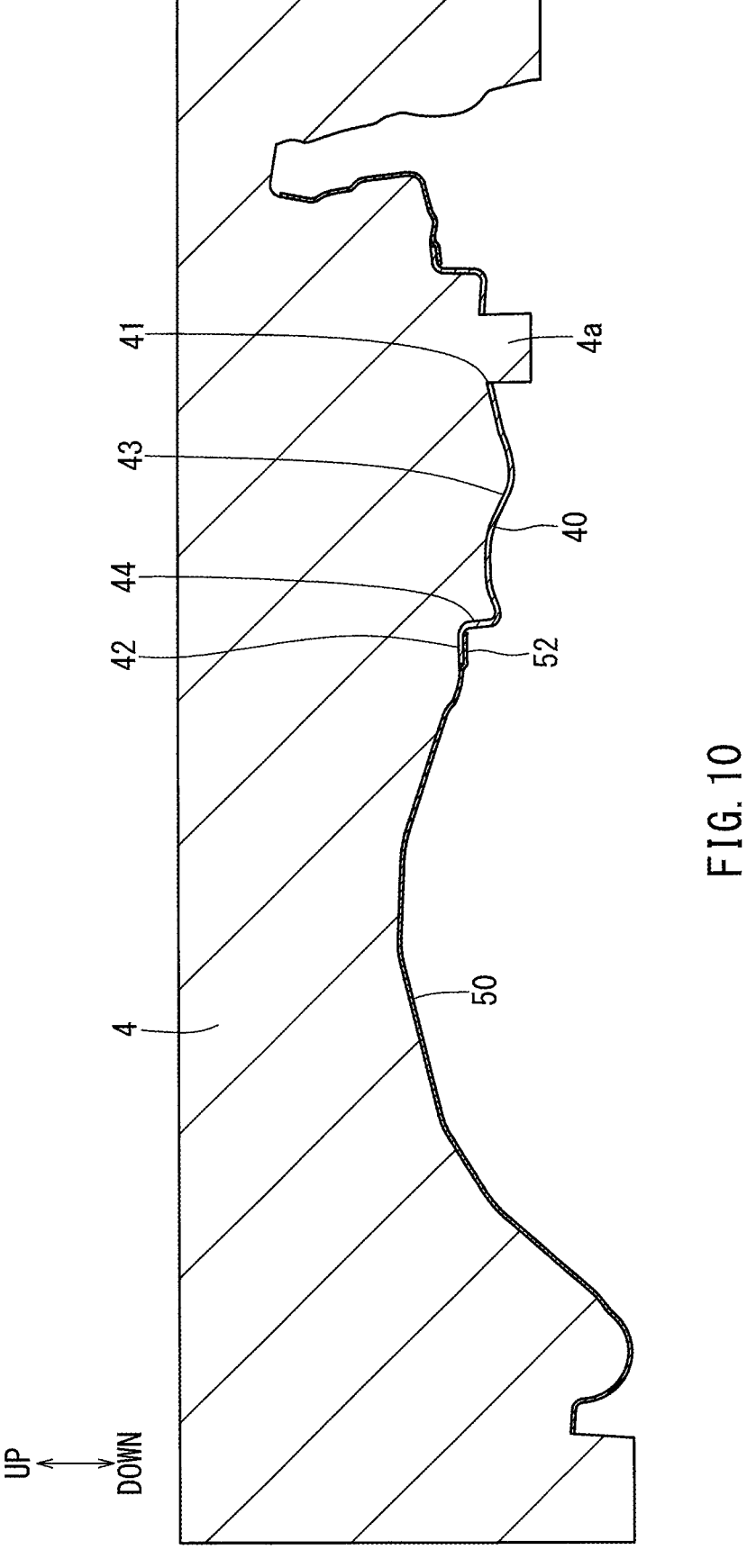
FIG. 10 is a schematic diagram showing a state in which the duct member and the back surface member are set on an upper die.

A method for manufacturing the seat cushion 1 is described below. First, the duct member 40 and the passage cover 3 are formed into a predetermined shape in advance by pressing or other means. As shown in FIG. 10, the duct member 40 is set to fit the shape of the upper die 4. Specifically, the bottom surface 43 and the side surface 44 of the duct member 40 are superimposed on the forming surface of the upper die 4. A projection 4*a* of the upper die 4 is inserted into the ventilation hole 41 of the duct member 40.

Next, the back surface member 50 is set in the upper die 4. The back surface member 50 is set overlapping the forming surface of the upper die 4, except the overlapping portion 52. The overlapping portion 52 is set to overlap the back surface (the bottom surface in FIG. 10) of the extension part 42 of the duct member 40. The duct member 40 and the back surface member 50 are secured so that they do not fall downward by gravitational action, for example by being vacuumed into the upper die 4.

Figure 11:
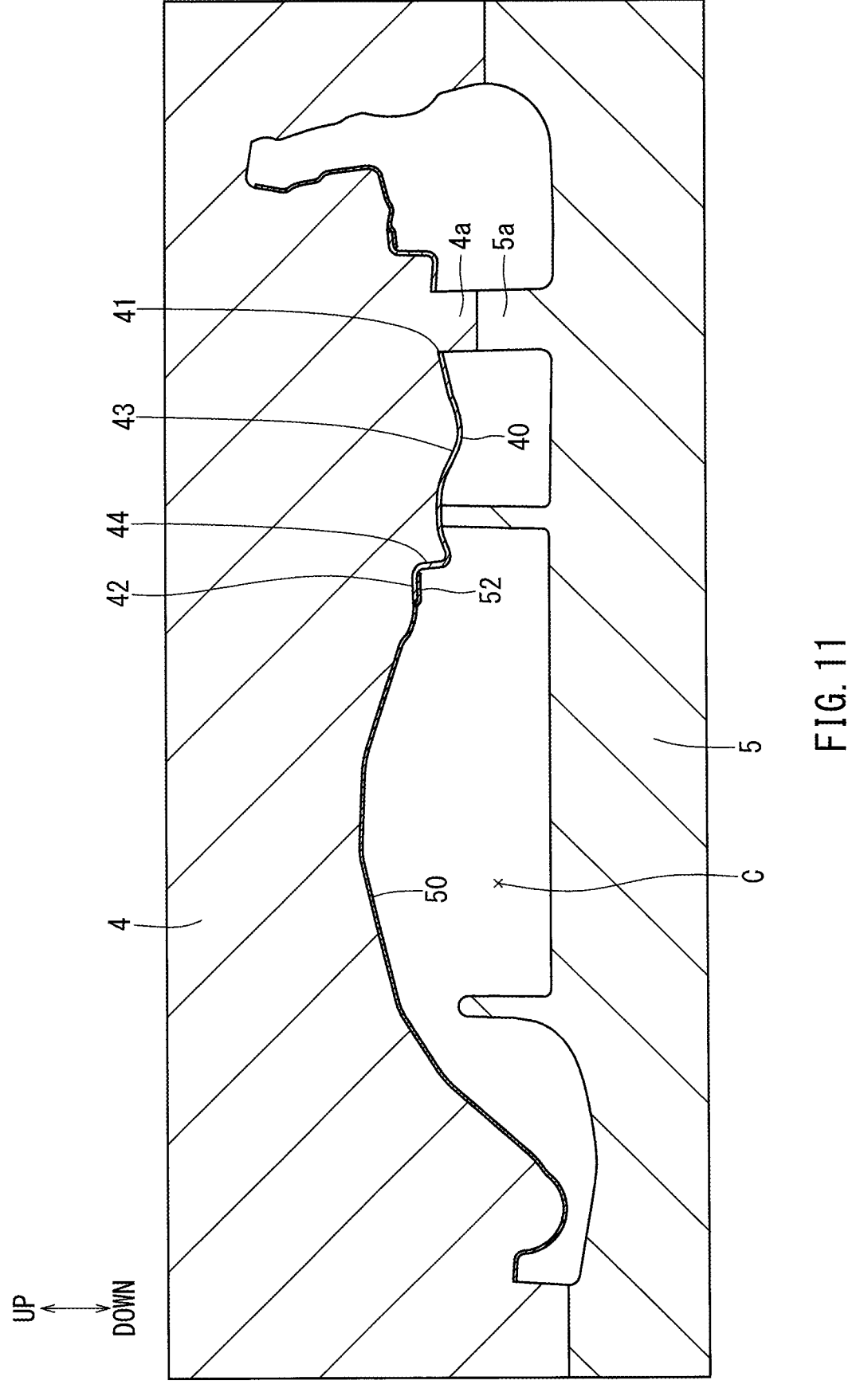
FIG. 11 is a schematic diagram showing a state in which the upper die and the lower die are clamped.

Next, as shown in FIG. 11, the upper die 4 and a lower die 5 are clamped. Thereby, a cavity C for molding the cushion pad 2 is formed. Also, a projection 5*a* of the lower die 5 is abutted against the projection 4*a* of the upper die 4. Then, liquid polyurethane is put into the cavity C, and the pad body 10 is foam-molded. The pad surface 11 of the pad body 10 is formed by the forming surface of the lower die 5. The ventilation hole 30 passing through the pad body 10 is formed by abutting the projection 4*a* and the projection 5*a*. The ventilation hole 30 and the ventilation hole 41 of the duct member 40 are connected by the projection 4*a* of the upper die 4.

Figure 12:
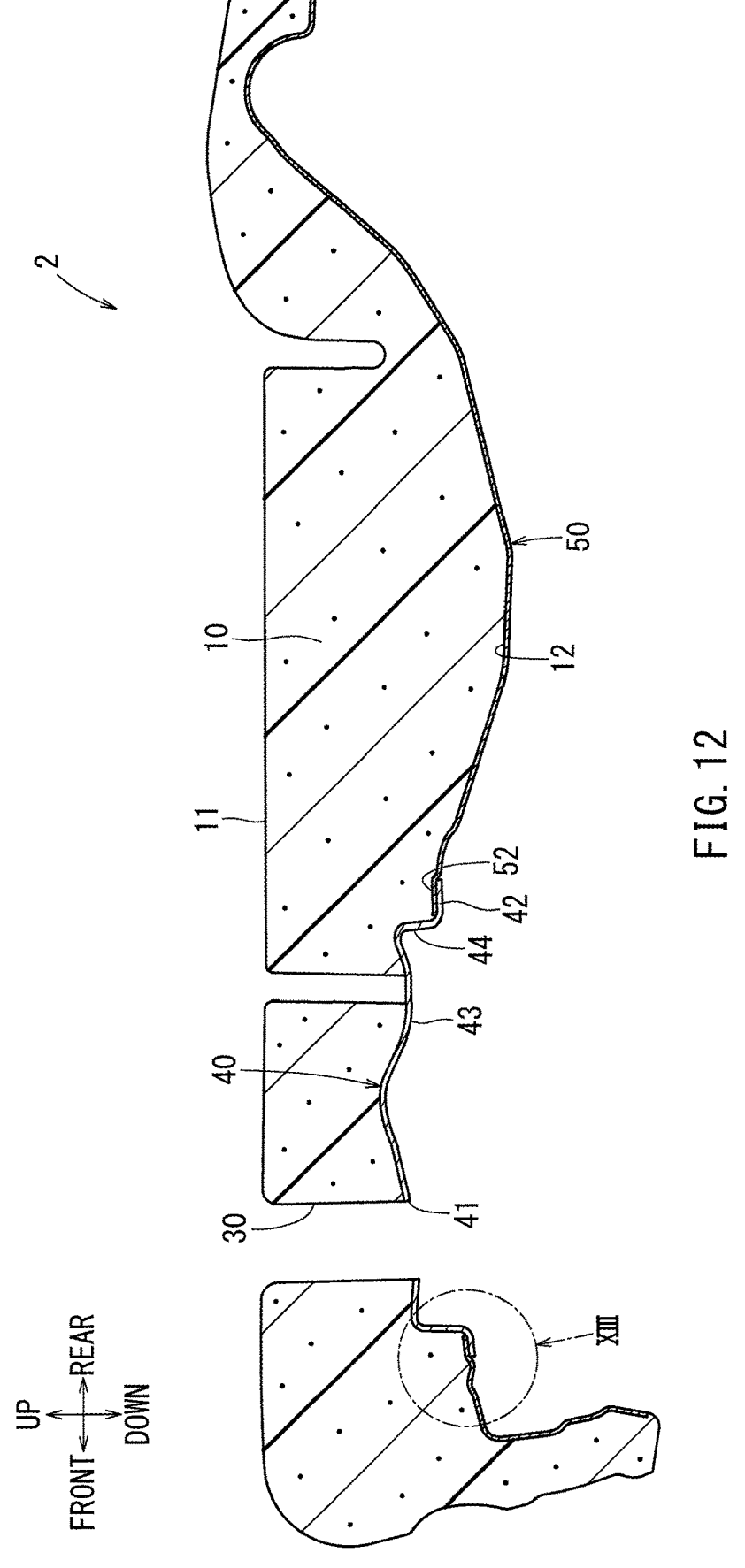
FIG. 12 is a cross-sectional view of the seat pad of FIG. 1 taken along the line XII-XII of FIG. 7.

As shown in FIG. 12, the duct member 40 and the back surface member 50 are integrally molded with the pad body 10. Thereby, the back surface member 50 is impregnated with liquid polyurethane and cured to become one with the pad body 10. The duct member 40 is impregnated with liquid polyurethane on its contact surface with the duct member 40 and is bonded to the pad body 10. The molding surface of the upper die 4 provides a flush surface between the extension part 42 of the duct member 40 and the back surface member 50 (see FIG. 11).

Figure 13:
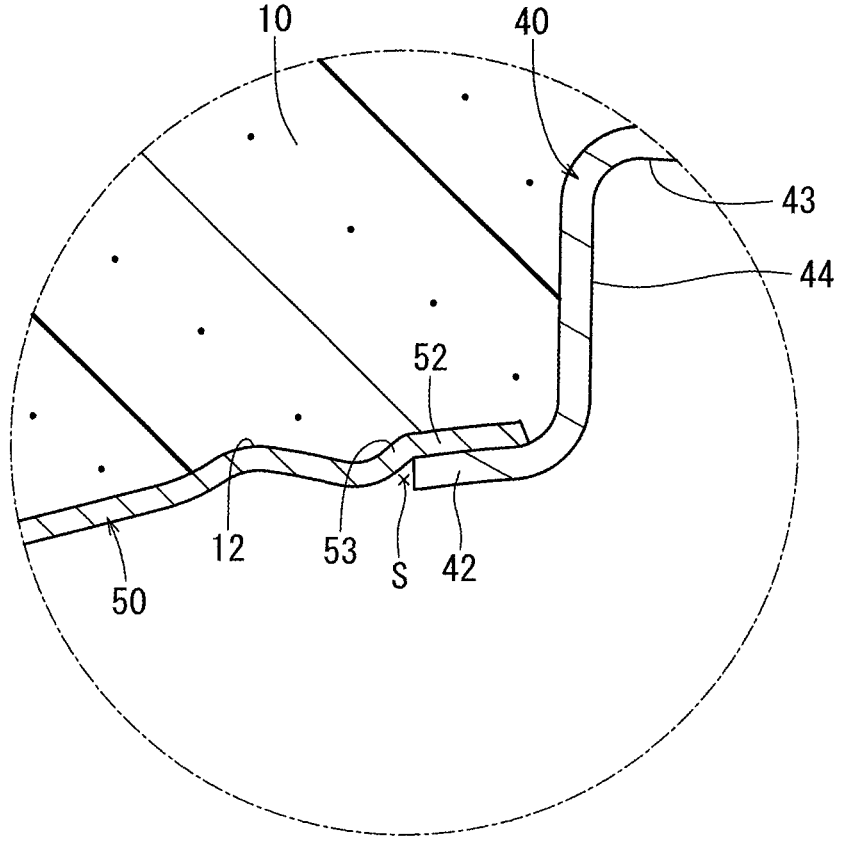
FIG. 13 is an enlarged view of section XIII of FIG. 12.

As shown in FIG. 13, the extension part 42 of the duct member 40 and the overlapping portion 52 of the back surface member 50 are overlapped in the perpendicular direction, so that prevents the urethane leakage from between the duct member 40 and the back surface member 50 when the pad body 10 is molded. After being integrally molded, a portion extending along the pad back surface 12 from the overlapping portion 52 of the back surface member 50 becomes an inclined portion 53 extending downward with a gentle slope. Thereby, a space S that opens toward the bottom of the seat is formed between the inclined portion 53 and the end portion of the extension part 42.

As shown in FIG. 9, the adhesive 60 is applied to the space S. Then, the periphery of the inner surface of the passage cover 3 (the upper surface in FIG. 8) is attached to the adhesive 60, thereby bonding the passage cover 3 to the duct member 40 and the back surface member 50. By applying the adhesive 60 to the space S between the inclined portion 53 and the extension part 42, the passage cover 3 can be adhered to the extension part 42 and the back surface member 50 of the duct member 40 in a state where the surfaces are properly aligned with the duct member 40 without the passage cover 3 being floated by the thickness of the adhesive 60. Moreover, dripping of the adhesive 60 to the outside can be suppressed, and labor for repairing when the adhesive 60 protrudes from the passage cover 3 can be reduced. As shown in FIG. 8, the fan (not shown) and the flow passages are connected so that the opening of the ventilation passage 20 is closed by adhering the passage cover 3.

In summary, the seat pad according to one embodiment has the following configuration. In the following, the symbols shown in parentheses are the symbols corresponding to the configurations shown in the above embodiments.

A seat pad (2) has a pad body (10) made of a polyurethane foam molding, a concave ventilation passage (20) extending along a pad back surface (12) of the pad body (10), a duct member (40) harder than the pad body (10) forming the inner peripheral wall of the ventilation passage (20), and a planar back surface member (50) provided along the pad back surface (12). The duct member (40) and the back surface member (50) are integrally foam-molded with the pad body (10). The back surface member (50) has an overlapping portion (52) which is not provided on a bottom surface (43) of the ventilation passage (20) but is provided so as to overlap the duct member (40) in the direction perpendicular to the plane in a non-bottom area outside the bottom surface (43).

With such a configuration, the shape of the ventilation passage (20) can be maintained by using the hard duct member (40), and deterioration of the air conditioning performance can be prevented even if the load of the seated person is received. Overlapping the duct member (40) and the back surface member (50) therefore prevents the urethane leakage from the overlapping portion (52) during foam molding of the pad body (10).

The duct member (40) has an extension part (42) extending out of the ventilation passage (20) and along the pad back surface (12). The overlapping portion (52) overlaps the extension part (42) in the direction perpendicular to the plane. This structure stacks the back surface member (50) and the duct member (40) easily without forming a complicated shape such as overlapping the back surface member (50) with the concave shape of the ventilation passage (20). In addition, the overlapping portion (52) overlaps the duct member (40) in a region outside the ventilation passage (20), therefore enlarges the ventilation passage (20).

The extension part (42) overlaps the back surface member (50) so as to sandwich the overlapping portion (52) with the pad back surface (12). With such a configuration, the end of the overlapping portion (52), which is difficult to fix due to the flexibility of the back surface member (50), can be properly fixed by being sandwiched between the extension part (42) and the pad back surface (12). Therefore, the appearance of the back surface of the sheet can be improved.

As described above, the present disclosure has been described using one embodiment, but the present disclosure can be implemented in various forms other than the above-described embodiment.

The seat pad can be applied not only to seat cushions but also to seat backs. Further, in addition to automobile seats, the present disclosure can be widely applied to seats provided for various vehicles such as railway vehicles other than automobiles, aircraft, ships, etc., or non-vehicle seats used in public facilities such as movie theaters and homes.

In addition to the shapes shown in the above embodiments, the ventilation path may have any shape as long as it is a concave shape extending along the rear surface of the pad.

The duct member may be a press felt, or non-preformed planar non-woven fabric. The duct member may be made of resin other than non-woven fabric.

The back surface member may be configured to extend so as to be superimposed on the side surface of the ventilation passage in the direction perpendicular to the plane. In the configuration of the back surface member, the overlapping portion may be overlapped with the duct member in the direction perpendicular to the plane in the side area of the ventilation passage. Also in this configuration, the duct member may or may not have extensions. The overlapping portion may overlap with the duct member so as to sandwich the duct member with the rear surface of the pad.

The channel cover may be assembled to the cushion pad by any means other than an adhesive. Further, the passage cover may be configured to be integrally formed with the pad body.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved seat pad, and/or methods of making and using the same.

What is claimed is:

1. A seat pad comprising:
a pad body made of a polyurethane foam molding;
a ventilation passage extending along a pad back surface of the pad body;
a duct member which is harder than the pad body and forms an inner peripheral wall of the ventilation passage; and
a back surface member provided along the pad back surface,
wherein:
the duct member and the back surface member are integrally foam-molded with the pad body;
the back surface member has an overlapping portion that overlaps the duct member in a direction perpendicular to a surface of the back surface member in a non-bottom area outside a bottom surface of the ventilation passage; and the duct member further comprises a bottom surface, a side surface, and a plurality of bank portions.

2. The seat pad of claim 1, wherein
the duct member has an extension part extending out of the ventilation passage and along the pad back surface; and
the overlapping portion overlaps the extension part in the direction perpendicular to the surface of the back surface member.

3. The seat pad of claim 2, wherein the extension part overlaps the back surface member so as to sandwich the overlapping portion with the pad back surface.

4. The seat pad of claim 1, wherein the plurality of bank portions are configured to protrude from the bottom surface of the duct member.

5. The seat pad of claim 1, further comprising a plurality of ventilation holes which are configured to penetrate through the pad body.

6. The seat pad of claim 1, wherein the ventilation passage comprises an opening that opens downward to the seat.

7. A seat pad comprising:
a pad body made of a polyurethane foam molding;
a ventilation passage extending along a pad back surface of the pad body;
a duct member which is harder than the pad body and forms an inner peripheral wall of the ventilation passage; and
a back surface member provided along the pad back surface,
wherein:
the duct member and the back surface member are integrally foam-molded with the pad body;
the back surface member has an overlapping portion that overlaps the duct member in a direction perpendicular to a surface of the back surface member in a non-bottom area outside a bottom surface of the ventilation passage;
the ventilation passage comprises an opening that opens downward to the seat; and
a passage cover which covers the ventilation passage.

8. The seat pad of claim 7, wherein the passage cover comprises a plurality of positioning projections abutting against a side surface of each of the plurality of bank portions, respectively.

9. The seat pad of claim 7, wherein the passage cover comprises a connection port which is opened for penetrating the passage cover.

* * * * *